United States Patent Office 2,879,587
Patented Mar. 31, 1959

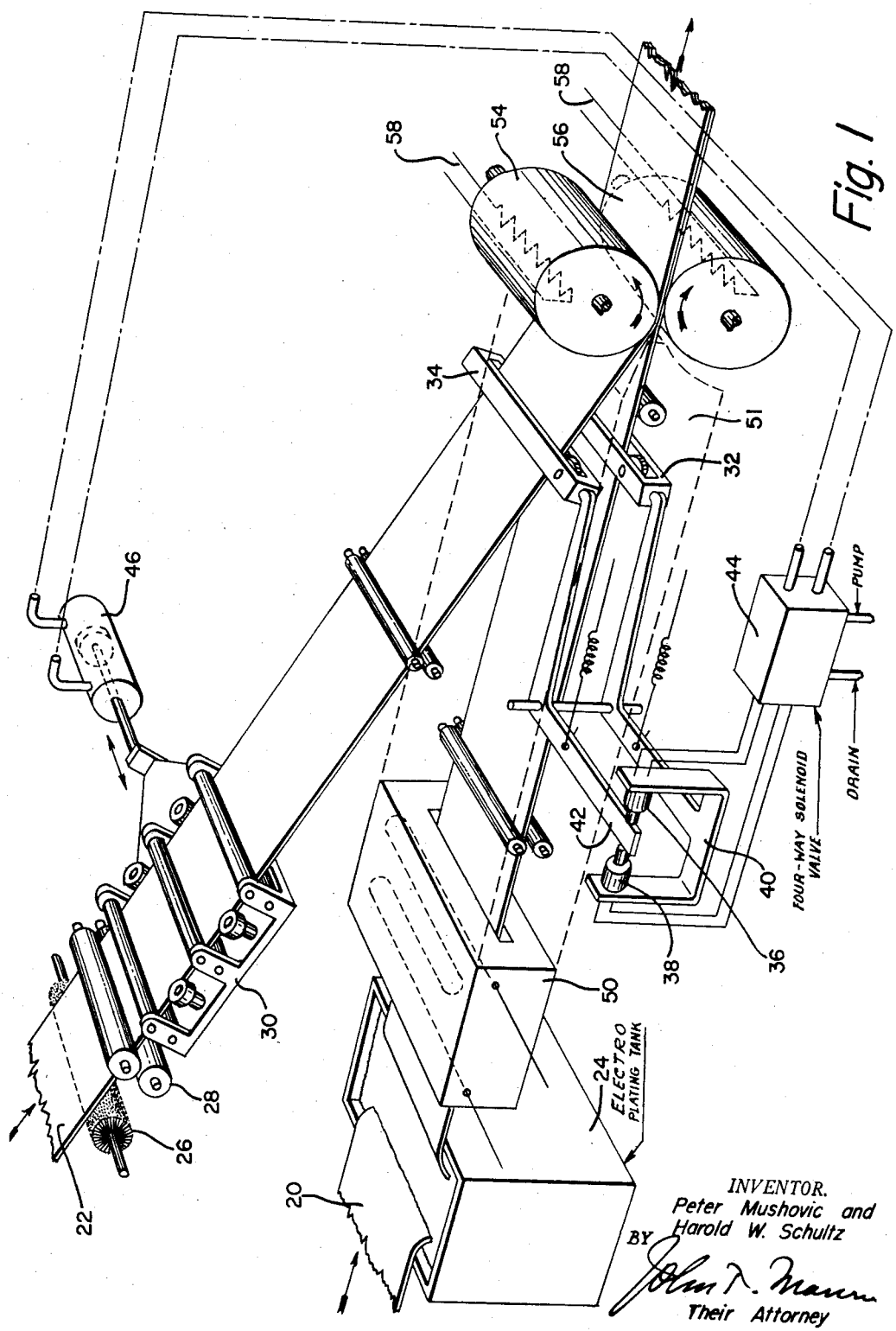

2,879,587
METHOD FOR MAKING COMPOSITE STOCK

Peter Mushovic and Harold W. Schultz, Dayton, Ohio, assignors to General Motors Corporation, Detroit, Mich., a corporation of Delaware Application July 23, 1954, Serial No. 445,332

2 Claims. (Cl. 29—488)

This invention relates to the manufacture of composite stock and is particularly directed to a method for bonding aluminum or aluminum alloy stock to a steel supporting member.

The main object of the invention is, therefore, to provide a commercial method for bonding aluminum or aluminum alloy stock to steel supporting members whereby the composite stock formed is devoid of a brittle iron-aluminum interlayer at the interface.

Another object of the invention is to provide a method for making composite stock, comprising a layer of aluminum, or aluminum alloy, bonded to a supporting layer of a ferrous metal wherein the bond is of a coextensive nature and is devoid of the usual brittle characteristics normally found in iron-aluminum bonds.

In carrying out the above object, it is still a further object to control the temperatures of the bonding operation by supplying heat to the steel member only whereby the aluminum upon contacting the steel is heated by conduction to the desired bonding temperature and wherein the two strips in heated condition are rolled under conditions for forming the desired bond at the interface.

Another object of the invention is to provide a method for continuously forming composite stock comprising a layer of aluminum coextensively bonded to a layer of steel wherein the steel stock is progressively heated to a predetermined temperature prior to contacting the aluminum stock and wherein the aluminum stock is heated only by conduction after being juxtaposed upon the steel whereupon the two strips are rolled together under controlled conditions for deforming the aluminum and reducing its thickness for forming a coextensive bond at the interface which is devoid of the usual brittle iron-aluminum alloy.

A still further object of the invention is to provide a method for forming composite stock continuously, comprising a layer of aluminum or aluminum alloy coextensively bonded to a layer of ferrous material wherein strips of aluminum and steel, for example, are fed to a rolling apparatus wherein the feed rate of the aluminum is approximately one-third that of the steel and wherein the steel is heated to a predetermined temperature sufficient to supply heat to the aluminum solely by conduction when the aluminum is juxtaposed upon the steel and wherein the aluminum is caused to be deformed by the rolling operation to approximately 33% of its original thickness whereupon the aluminum is extruded backwardly along the surface of the steel to form a bond devoid of brittle iron aluminum alloy.

Further objects and advantages of the present invention will be apparent from the following description, reference being had to the accompanying drawing wherein a diagrammatic showing of a suitable apparatus for carrying out the process defined herein is disclosed.

A method for bonding aluminum to steel has been disclosed in our copending application, Serial No. 195,535, now Patent 2,782,498, wherein aluminum and steel stock are passed between rolls and wherein the temperature at the point of bonding is controlled to within predetermined temperature limits. In this method the aluminum is deformed by pressure applied by the rolls between predetermined limits for providing a satisfactory bond. In the method disclosed in said copending application, the aluminum and the steel are heated concurrently and this heat may be applied by the rolls or it may be applied at a point remote from the rolls as disclosed in Schultz application, Serial No. 431,516, now Patent 2,809,422. In all cases, the aluminum strip material is heated to the same temperature as the steel strip. This necessitates rather critical temperature control limits in the operation since the heating of the aluminum is a critical factor due to the fact that its melting point is being approached during the heating operation and further, if the temperature of the aluminum is raised in excess of about 1010° F., a brittle iron-aluminum interlayer is formed during the bonding operation. This temperature limit varies with the degree of compression of the aluminum as fully disclosed in the aforementioned applications. Further, due to the difference in the rate of heat conduction between aluminum and steel, it is difficult to maintain control conditions under prior art methods.

We have now found that these temperature control limits may be broadened considerably and the process simplified if the heat is applied only to the steel. This is explained by the fact that the steel has a relatively high melting point as compared to aluminum or aluminum alloy, and furthermore, steel is not as readily oxidized as the aluminum. Therefore, if all of the heat is supplied to the steel and then the aluminum is juxtaposed thereon just prior to the compression step, numerous control factors in the commercial process of producing composite strip from aluminum and steel material may be eliminated or simplified.

Referring to the drawing, a diagrammatic showing of apparatus used for carrying out the process is disclosed. This apparatus is claimed in copending application, Serial No. 445,320, now Patent 2,775,877, filed concurrently herewith and assigned to the assignee of this invention. In the drawing, 20 represents steel strip stock fed from a suitable source of supply while 22 represents aluminum or aluminum alloy stock also fed from a suitable source of supply. The steel is preferably cleaned as by conventional chemical cleaning and is then fed through an electro-plating tank 24 wherein a flash coat of copper in the order of .00002″ thick or less is applied. This is quite important since if the copper flash is too thick, an unsatisfactory bond is usually obtained. However, if the copper layer is maintained between .00002″ and not less than a flash in thickness, the bond is uniformly good. This flash copper coating is applied to help protect the surface of the steel from any superficial oxidation prior to the bonding step and thus facilitates bonding. It is understood that it is possible to omit the copper plating of the steel strip if careful atmospheric control is maintained, although plating is the preferred procedure.

The aluminum strip is passed over a scratch brush 26 which thoroughly roughens and cleans the surface after it passes between the tensioning rolls 28 and then through a strip shifting device 30 which keeps the aluminum strip aligned with the steel strip. The shifting device 30 is controlled by devices 32 and 34 on the steel and aluminum strips respectively just prior to the time said strips enter the rolls. Thus, if the steel strip moves out of line it actuates switches 36 or 38 carried by a yoke 40, which switches are also controlled by an arm 42 from the device 34. The switches 36 and 38 actuate a four-way solenoid valve 44 which, in turn, controls a cylinder 46 which bodily shifts the device 30 for aligning the aluminum strip. Thus, a constant control is maintained on the lateral alignment of the strips 20 and 22. The specific action of the device 30 is more completely disclosed in the aforesaid copending application Serial No. 445,320, now Patent 2,775,877, wherein the specific details of the structure are set forth.

The steel strip after emerging from the plating tank 24 is dried and next passes through an induction heating apparatus 50. This brings the steel to a temperature in the order of 1100° F. plus or minus 150° F. The steel should be maintained in a protective atmosphere from the time it is heated until it passes between the rolls. This is accomplished within the envelope 51 which encloses the strip and which is supplied with a nonoxidizing atmosphere (such as incompletely burned natural gas, nitrogen, hydrogen or mixtures thereof, etc.). In general, an atmosphere that contains less than .2 of 1% oxygen with a dew point of 0° F. or less is highly satisfactory. The aluminum strip in the meantime is preferably not heated since we have found that the aluminum strip 22 may be directly juxtaposed upon the steel strip 20 at the point of entry between rolls 54 and 56, and that it is heated by conduction from the steel strip to a desired temperature. As the two strips pass between the rolls 54 and 56 the aluminum is drastically deformed, for example, in the order of from 55% to 75% of its thickness. Preferably the aluminum strip is deformed between 60% and 70% of its thickness or about ⅔ of its thickness. This deformation causes a backward extrusion of the aluminum along the steel whereby some additional heat is generated and in view of the deformation, it is apparent that the aluminum strip 22 must be fed to the rolls at a much slower rate than the steel strip 20. For a deformation of about 66% in the aluminum strip, the feed rate of the aluminum is about ⅓ of the feed rate of the steel. In this rolling step the aluminum layer will become slightly wider as it is compressed and proper width stock should be determined in each case so that no overlap occurs.

The rolls 54 and 56 have a suitable temperature controlling apparatus 58 therein which may be used to add heat to the rollers during the starting periods of the apparatus, if desired. After the apparatus is in operation, the extrusion of the aluminum creates sufficient heat to maintain the temperature equilibrium at the point of the rolls. It is to be understood that if the feed of the two strips is of sufficient velocity there may be an actual build up of heat at the rolls in which case it is desirable to extract heat from the rolls to maintain equilibrium conditions. In this case, the temperature control units 58 within the rolls may take the form of cooling coils, such expedients coming fully within the scope of the invention, the important fact being that the temperature of the rolls is held at an equilibrium temperature conducive to proper bonding of the aluminum to the steel without the production of a brittle iron-aluminum interlayer.

We have found that if the temperature of the aluminum strip is maintained between 800° F. and 1010° F. as produced by conduction of heat from the steel at the point of entry between the rolls 56 and 58 and if the percentage reduction in thickness of the aluminum varies from 75% to 55% of the total thickness thereof, a satisfactory bond is produced.

This bond is of a very peculiar nature and is difficult to define. We have found that the bond may be termed of a superficial type in that no brittle iron-aluminum is visible under the microscope nor is any diffusion apparent, however, the bond is of such great strength that a piece of composite stock made by this method may be bent double and even then it is impossible to chisel the aluminum off the steel in view of the tenacity of the bond. Thus, the bond has great strength without any visible intermingling of the metals. This is in complete contrast to the usual bonds between aluminum and steel wherein a completely visible brittle iron-aluminum interlayer is present, that disrupts the bond upon bending of the material. It is therefore apparent that the present bond is entirely different in physical and metallurgical character than the usual bonds produced by casting aluminum upon steel or by rolling aluminum upon steel wherein different control conditions of pressure and temperature are maintained.

A specific example of bonding aluminum stock to steel stock is as follows: SAE 1010 steel stock 4.160" wide and .054 thick is fed at the rate of 20 feet per minute to the rolls 56 and 58. This stock is plated with .00002" of copper prior to being heated in the induction unit 50. The induction unit 50 is positioned preferably about 1½ feet from the rolls and brings the steel strip to a temperature of 1200° F. Aluminum stock having a composition of 1% cadmium, 4% silicon, balance aluminum and having a thickness of .045" and a width of 4.016 (.100 less than steel) is fed at the rate of about 6⅔ feet per minute and is scratch-brushed by a wire brush at the contacting surface thereof and is then fed to the rolls 56 and 58 at room temperature. The roll pressure is maintained so that the thickness of the aluminum strip is reduced 66% as it is compressed against the steel strip, while the steel strip suffers no appreciable deformation (1% to 5% maximum). As the two strips contact one another, the aluminum strip is heated sufficiently by conduction and by the extrusion process to form a fully coextensive bond without the brittle iron-aluminum interlayer and which will withstand the bending test above referred to. The completed composite stock will have an average thickness in the order of .069" wherein the steel is still in the order of .054" while the aluminum layer is in the order of .015". This is but one example of a commercial process of producing composite stock and it is apparent that other thicknesses of stock may be produced by the same method utilizing varying thicknesses of the component materials. It is further apparent that the temperatures noted may be varied according to the speed and thickness of the stock and that this example is merely given as being exemplary of a commercial production process on one dimension of strip.

While the foregoing has been directed to a description of a method for producing a bimetal strip, it is apparent that more than two strips may be bonded together simultaneously. For example, a steel strip may have aluminum bonded to both sides thereof in a single pass through the rolls by following the teachings herein.

While the embodiments of the present invention as herein disclosed, constitute preferred forms, it is to be understood that other forms might be adopted.

What is claimed is as follows:

1. The steps in the method of making composite aluminum on steel stock wherein the aluminum and steel are in strip-like form and are bonded at their interface, the steps comprising; progressively scratch-brushing one surface of an aluminum strip while the strip is moving in one direction, progressively copper flash-plating one surface of a steel strip while said strip is moving in the same direction as the aluminum strip and at a faster rate, progressively heating the steel strip only to a temperature sufficient to subsequently produce a temperature in the order of from 800° F. to 1010° F. at the interface, then progressively superimposing the scratch-brushed surface of the aluminum onto the flash-plated surface of the heated steel strip and simultaneously rolling the juxtaposed strips under sufficient pressures to reduce the thickness of the aluminum only to from 55% ot 75% of its original thickness and simultaneously causing the aluminum strip to bond to the surface of the steel strip.

2. In the method of making composite strip material including a layer which is predominantly aluminum and another layer which is steel, the steps comprising; supplying two strips, one of steel and the other of a metal which is predominantly aluminum, moving said strips in the same direction out of contact with one another preparing the surfaces of said two strips progressively for the subsequent bonding operation while said strips are out of contact with one another by scratch brushing the surface of the predominantly aluminum strip and flash copper plating the surface of the steel strip, progressively heating the steel strip only to a temperature in the order of 1200 F., progressively feeding the steel and aluminum strips to a pair of rolls wherein the rates of travel of the two strips are in the ratio of three to one, progressively rolling the two strips with their prepared surfaces in contact with one another for heating the aluminum by conduction from the steel and for simultaneously reducing the thickness of the aluminum strip in the order of 66% of its original thickness for forming a composite strip wherein the aluminum layer is substantially one-third of the thickness of the original aluminum strip supplied.

References Cited in the file of this patent

UNITED STATES PATENTS

| | | |
|---|---|---|
| 2,484,118 | Reynolds | Oct. 11, 1949 |
| 2,539,247 | Hensel | Jan. 23, 1951 |
| 2,691,208 | Brennan | Oct. 12, 1954 |
| 2,693,121 | Dight | Nov. 2, 1954 |
| 2,735,170 | Moffatt | Feb. 21, 1956 |
| 2,782,498 | Mushovic et al. | Feb. 26, 1957 |

FOREIGN PATENTS

| | | |
|---|---|---|
| 628,198 | Great Britain | Aug. 24, 1949 |